(12) United States Patent
Kagan et al.

(10) Patent No.: US 8,021,753 B2
(45) Date of Patent: *Sep. 20, 2011

(54) FILM HAVING ALTERNATING MONOLAYERS OF A METAL-METAL BONDED COMPLEX MONOLAYER AND AN ORGANIC MONOLAYER BY LAYER-BY-LAYER GROWTH

(75) Inventors: Cherie R. Kagan, Ossining, NY (US); Chun Lin, Croton-On-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/179,846

(22) Filed: Jul. 25, 2008

(65) Prior Publication Data

US 2009/0075097 A1  Mar. 19, 2009

Related U.S. Application Data

(62) Division of application No. 11/684,506, filed on Mar. 9, 2007, now Pat. No. 7,445,815, which is a division of application No. 10/117,788, filed on Apr. 5, 2002, now Pat. No. 7,189,433.

(51) Int. Cl.
*B32B 7/04* (2006.01)
*B32B 29/00* (2006.01)
*B32B 9/04* (2006.01)

(52) U.S. Cl. .................. 428/420; 428/411.1; 427/419.8

(58) Field of Classification Search .................. None
See application file for complete search history.

(56) References Cited

U.S. PATENT DOCUMENTS

| | | | |
|---|---|---|---|
| 5,217,792 A | 6/1993 | Chidsey et al. | |
| 5,326,626 A | 7/1994 | Chidsey et al. | |
| 6,128,214 A | 10/2000 | Kuckes et al. | |
| 6,198,655 B1 | 3/2001 | Heath et al. | |
| 6,314,019 B1 | 11/2001 | Kuckes et al. | |
| 6,479,240 B1 | 11/2002 | Kayyem et al. | |
| 6,646,285 B1 | 11/2003 | Kagan et al. | |
| 2001/0054709 A1 | 12/2001 | Heath et al. | |
| 2002/0121314 A1 | 9/2002 | Tao et al. | |

OTHER PUBLICATIONS

Cotton et al., Accounts of Chemical Research, 34, 10, pp. 759 (2001).*
Takahagi et al., Japan Journal of Applied Physics, 35, pp. 3542, (1996).*
Luo et al., Langmuir, 14, pp. 3602, (1998).*
Albagli, David; doctoral thesis, MIT, 1990.*

(Continued)

*Primary Examiner* — Alicia Chevalier
*Assistant Examiner* — Frank D Ducheneaux
(74) *Attorney, Agent, or Firm* — Connolly Bove Lodge & Hutz LLP

(57) ABSTRACT

The present invention provides a process for preparing a thin film having alternating monolayers of a metal-metal bonded complex monolayer and an organic monolayer by layer-by-layer growth. The process comprises the steps of: (1) applying onto a surface of a substrate a first linker compound to produce a primer layer; (2) applying onto said primer layer a layer of a metal-metal bonded complex to produce a metal-metal bonded complex monolayer on said primer layer; (3) applying onto said metal-metal bonded complex monolayer a second linker compound; and optionally (4) sequentially repeating steps (2) and (3) at least once to produce said layer-by-layer grown thin film having alternating monolayers of a metal-metal bonded complex monolayer and an organic monolayer.

13 Claims, 4 Drawing Sheets

OTHER PUBLICATIONS

Lin et al., "Layer-by-Layer Growth of Metal-Metal Bonded Supramolecular Thin Films and Its Use in the Fabrication of Lateral Nanoscale Devices," J. Amer. Chem. Soc., 125, pp. 336-337, (2003).*

Cotton et al., "The first dirhodium-based supramolecular assemblies with interlocking latices and double helices," J. Chem. Soc., Dalton Trans., pp. 499-501, (2001).*

"One-Dimensional Polymers and Mesogens Incorporating Multiple Bonds Between Metal Atoms", Chisholm, Amernican Chemical Society 2000.

"Synthesis and Antitumor 'Activity' of certain Rhodium (II) Carboxylates", Hall et al., Institute of Molecular Medicine, vol. 10, No. 1, 1980.

"Chiral Dirhidium Carboxamidates: Catalysts for Highly Enantioselective Syntheses of Lactones and Lactams" Doyle, Trinity University, (1996).

"The Chemistry of Multielectron Excited States" Nocera, American Chemical Society, 1995.

"Layered Metal Phosphates and Phosphates: From Crystals to Monolayers" Cao et al., American Chemical Society 1992.

"Fuzzy Nanoassemblies: Toward Layered Polyermic Multicomposites", Decher, www.sciencemag.gov, vol. 277, Aug. 29, 1997.

"Coordinate Covalent Cobalt-Diisocyanide Multilayer Thin Films Grown One Molecular Layer at a time", Ansell et al., American Chemical Society, Nov. 27, 1999.

"Synthesis and Proton-Coupled Electron-Transfer Reaction of Self-Assembled Monolayers of a Ruthenium (II) Complex Containing Tridentate 2,6-Bis(benzimidazol-2-yl)pyridine on a Gold Surface: Comparison of Acid/Base Chemistry with Bulk Solution Chemistry," Haga et al., Inorg. Chem. 2000, 39, pp. 4566-4573, published on web Sep. 13, 2000.

"Photostability, Electrochemistry, and Monolayers of [M(bpy)2(trans-1,2-bis(4-pyridyl)ethylene)L]+ (M = Ru, Os; L = Cl, $H_2O$)", Forster et al., Langmuir 2000, 16, pp. 7867-7870, published on web Aug. 31, 2000.

"Electron Tansfer Reactions of Self-Assembled Monolayers of Thio(Phenylacetylene)n-Substituted Chiral Metal-Salen Complexes", Nielsen et al. Langmuir 2002, 18, pp. 2795-2799, published on web Feb. 23, 2002.

"XPS Study of Self-Assembly of Ruthenium Dimers [((acac)2Ru)2bptz]0, + on Hydrophobic and Hydrophilic SAMs," Varughese et al., Langmuir, 2002, 18, pp. 7964-7970, published on web Sep. 21, 2002.

* cited by examiner

FILM HAVING ALTERNATING MONOLAYERS OF A METAL-METAL BONDED COMPLEX MONOLAYER AND AN ORGANIC MONOLAYER BY LAYER-BY-LAYER GROWTH

This application is a divisional of U.S. application Ser. No. 11/684,506, filed on March 9, 2007, now U.S. Pat. No. 7,445,815 which claims priority to Ser. No. 10/117,788, filed on Apr. 5, 2002, now U.S. Pat. No. 7,189,433 the entire contents of all are hereby incorporated by reference.

BACKGROUND OF THE INVENTION

1. Field of the Invention

The present invention relates to a process for preparing a thin film having alternating monolayers of a metal-metal bonded complex monolayer and an organic monolayer by layer-by-layer growth. More particularly, the present invention relates to a thin film having alternating monolayers of a metal-metal bonded complex monolayer and an organic monolayer.

2. Description of the Prior Art

During the past three decades, considerable progress has been made in the understanding of dinuclear compounds containing multiple metal-metal bonds. Both the experimental and the theoretical aspects of these compounds have been explored extensively. These studies have provided a large body of information particularly in the following areas: the reactivities of the dinuclear cores, the strengths of metal-metal interactions, the electronic transitions between metal-based orbitals and those involving metal to ligand charge transfer, the redox activities of the dinuclear core, and the correlation among these properties (See, e.g., Cotton, Walton, Multiple Bonds Between Metal Atoms, 2nd Ed., Oxford, 1993).

Efforts focusing on technologically important applications of dinuclear compounds have led to many promising research areas, such as inorganic liquid crystals (See, e.g., Chisholm, Acc. Chem. Res., 2000, 33, 53), antitumor agents (See, e.g., Hall, et al, J. Clin. Hematol. Oncol., 1980, 10, 25), and homogeneous and photolytic catalysis (See, e.g., Doyle, Aldrichimica Acta, 1996, 29, 3; Nocera, Acc. Chem. Res., 1995, 28, 209).

Layer-by-layer assembly techniques to fabricate multi-component films has been explored in the literature. One of the most developed systems grown layer-by-layer is the layered metal phosphates and phosphonates. The films include multivalent metal ions, e.g. $Zr^{4+}$, and organic molecules terminated with an acidic functionality, e.g. a phosphonic acid (See, e.g., Cao, Hong, Mallouk, Acc. Chem. Res., 1992, 25, 420). Katz and co-workers have used this method to align hyperpolarizable molecules into polar multilayer films that show second-order nonlinear optical effects (See, e.g., U.S. Pat. Nos. 5,217,792 and 5,326,626). A similar approach has also been extended to other materials such as polymers, natural proteins, colloids, and inorganic clusters (See, e.g., Decher, Science, 1997, 277, 1232). This same technique has also been applied to the production of other multilayers including Co-diisocyanide, dithiols with Cu, and pyrazines with Ru (See, e.g., Page, Langmuir, 2000, 16, 1172).

Among the existing examples, the driving force for the film progression is mainly the electrostatical interaction between polycations and polyanions; few examples involve other types of interactions, such as hydrogen bond, covalent, or mixed covalent-ionic. The present invention utilizes strong covalent interactions, rather than ionic interactions, between the metals and the ligands in a novel strategy to assemble nearly perfectly packed multilayers.

Despite the abundance of activity, efforts so far have been limited to the study and use of the metal-metal bonded compounds in solution-based systems. To harness the electronic, optical, and magnetic properties of metal-metal bonded materials in solid-state applications and devices, development of new methods for making thin films containing functional metal-metal bonded complexes are needed.

Accordingly, the present invention provides methods to grow multilayer thin films including metal-metal bonded compounds.

SUMMARY OF INVENTION

The present invention provides a process for preparing a thin film having alternating monolayers of a metal-metal bonded complex monolayer and an organic monolayer by layer-by-layer growth. The process includes the steps of:

(1) applying onto a surface of a substrate a first linker compound represented by the formula:

G1-Linker$_a$-G2 to produce a primer layer of said first linker compound on said substrate, wherein G1 is a functional group capable of interacting with said surface of said substrate; G2 is a functional group capable of interacting with a metal-metal bonded complex; and Linker$_a$ is a difunctional organic group bonded to G1 and G2;

(2) applying onto said primer layer a layer of a metal-metal bonded complex to produce a metal-metal bonded complex monolayer on said primer layer; said metal-metal bonded complex being selected from the group consisting of compounds represented by the following formulas:

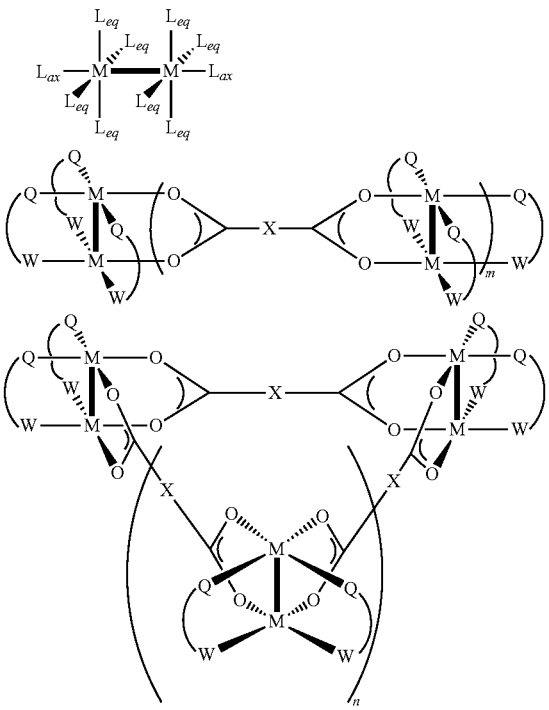

and a combination thereof; wherein:

L$_{ax}$ is an axial ligand;

$L_{eq}$ is an equatorial ligand; wherein two equatorial ligands together form a bidentate ligand

wherein each

is independently selected from the group consisting of:

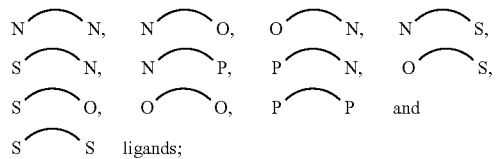

M is a transition metal; wherein

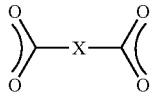

is a bridging group each selected independently from the group consisting of: $SO_4^{2-}$, $MoO_4^{2-}$, $WO_4^{2-}$, $ZnCl_4^{2-}$ and a dicarboxylate; and wherein m is an integer from 1 to 25, and n is 0 to 6;

(3) applying onto said metal-metal bonded complex monolayer a second linker compound represented by the formula:

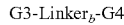

to produce on said metal-metal bonded complex monolayer an organic monolayer; wherein G3 and G4 are the same or different functional groups capable of interacting with a metal-metal bonded complex; and Linker$_b$ is a single bond or a difunctional organic group bonded to G3 and G4; and optionally (4) sequentially repeating steps (2) and (3) at least once to produce said layer-by-layer grown thin film having alternating monolayers of a metal-metal bonded complex monolayer and an organic monolayer.

More particularly, the present invention provides a process for preparing a thin film having alternating monolayers of a metal-metal bonded complex monolayer and an organic monolayer by layer-by-layer growth. The process includes the steps of:

(1) applying onto a surface of a substrate a first linker compound represented by the formula:

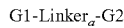

to produce a primer layer of said first linker compound; wherein G1 is selected from the group consisting of: $Cl_3Si$ and SH; G2 is selected from the group consisting of: 4-pyridyl and 4-cyanophenyl; and Linker$_a$ is selected from the group consisting of: $C_1$-$C_8$ alkylene, $C_1$-$C_8$ alkenediyl, $C_1$-$C_8$ alkynediyl and 1,4-arylene;

(2) applying onto said primer layer a metal-metal bonded complex to produce on said primer layer a metal-metal bonded complex monolayer; wherein said metal-metal bonded complex is selected from the group consisting of compounds represented by the following formulas:

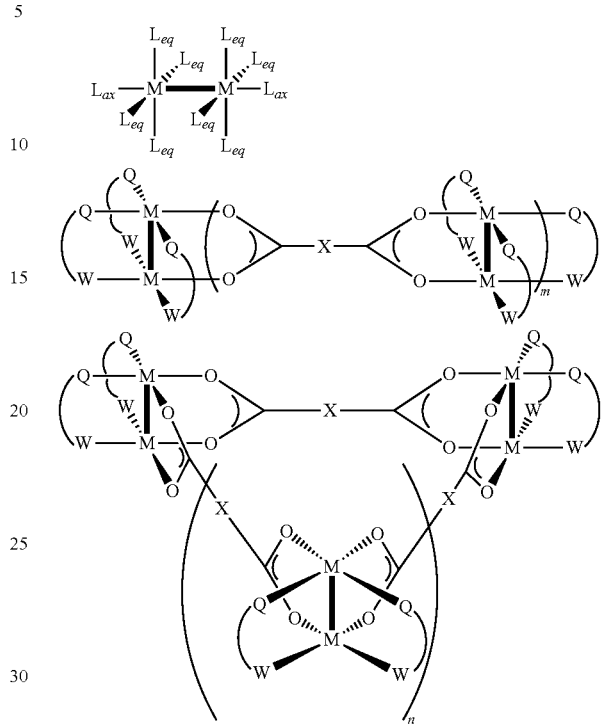

and a combination thereof; wherein:

$L_{ax}$ is an axial ligand;

$L_{eq}$ is an equatorial ligand; wherein two equatorial ligands together form a bidentate ligand

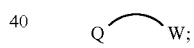

wherein each

is independently selected from the group consisting of:

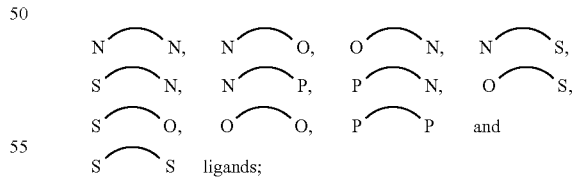

M is a transition metal; wherein the group

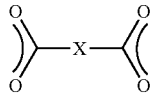

is a dicarboxylate bridging group selected from the group consisting of compounds represented by the formulas:

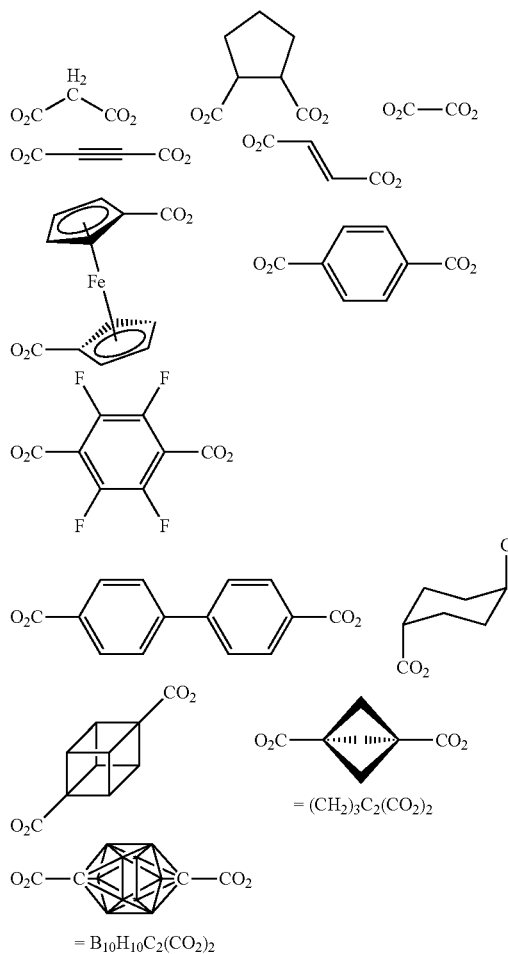

and mixtures thereof; and wherein m is an integer from 1 to 12, and n is 0 to 3;

(3) applying onto said metal-metal bonded complex monolayer a second linker compound represented by the formula:

G3-Linker$_b$-G4 to produce on said metal-metal bonded complex monolayer an organic monolayer; wherein G3 and G4 are the same or different functional groups capable of interacting with a metal-metal bonded complex; and Linker$_b$ is a single bond or a difunctional organic group bonded to G3 and G4; and optionally (4) sequentially repeating steps (2) and (3) at least once to produce said layer-by-layer grown thin film having alternating monolayers of a metal-metal bonded complex monolayer and an organic monolayer.

The present invention further provides a thin film having alternating monolayers of a metal-metal bonded complex monolayer and an organic monolayer by layer-by-layer growth. Such films can be prepared by the processes according to the present invention.

DETAILED DESCRIPTION OF THE INVENTION

Figure 1:
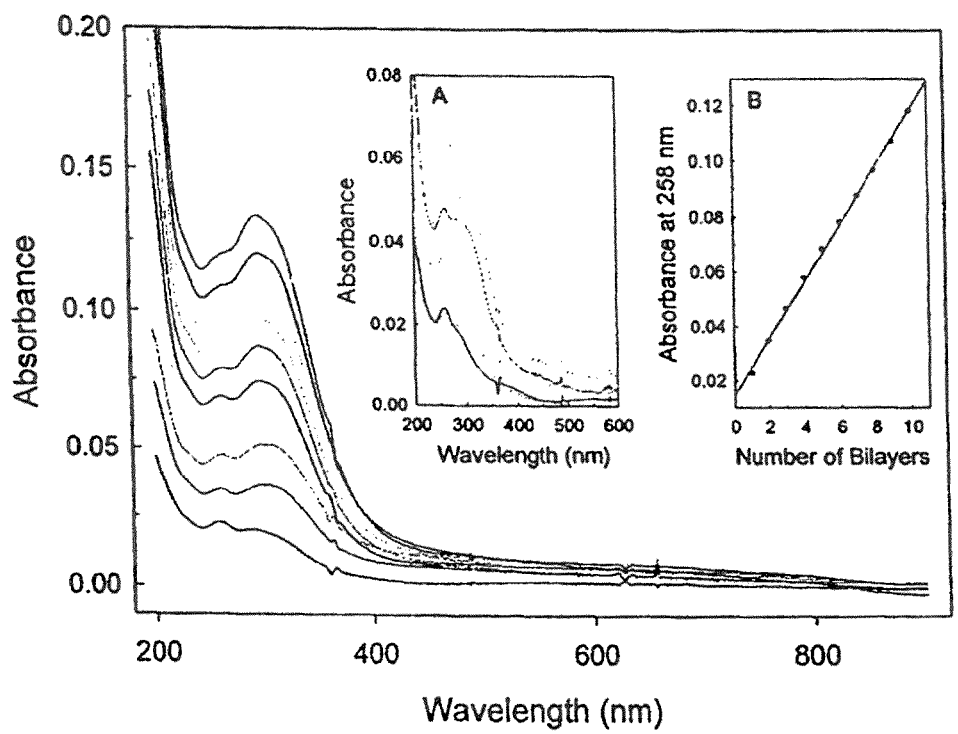
FIG. 1. UV-VIS spectra of bilayer films as multilayers are assembled increasing the film thickness from 1 to 10 bilayers. Inset: A. UV-vis spectra of the first three bilayers (total six monolayers) showing the alternative adding of the metal-metal bonded compounds (at 258 nm) and the organic species (at 296 nm). B. Increase in absorbance at 258 nm as a function of the number of added bilayers.

The processes described herein include layer-by-layer growth of thin films having alternating monolayers of metal-metal bonded complexes and organic molecules. Such films have utility in solid-state applications.

The films are prepared by repeated sequential depositions of metal-metal bonded units, e.g., dirhodium tetraformamidinate compounds, on a prefunctionalized substrate, followed by a proper organic linker, e.g., dipyridyl organic molecules, for the next deposition sequence.

The deposition method is a self-assembling, tunable and stepwise process. Upon application onto a substrate, the complexes are adsorbed on the substrate. Thereafter, an organic monolayer is applied. Thus, repeating the steps, a stepwise layer by layer growth of the thin films can be achieved.

The multi-layered thin films can be grown layer-by-layer to the desired thickness. The process comprises the following steps:

(1) applying onto a surface of a substrate a first linker compound represented by the formula:

G1-Linker$_a$-G2 to produce a primer layer of the first linker compound on the substrate, wherein G1 is a functional group capable of interacting with the surface of the substrate; G2 is a functional group capable of interacting with a metal-metal bonded complex; and Linker$_a$ is a difunctional organic group bonded to G1 and G2;

(2) applying onto the primer layer a layer of a metal-metal bonded complex to produce a metal-metal bonded complex monolayer on the primer layer; the metal-metal bonded complex being selected from the group consisting of compounds represented by the following formulas:

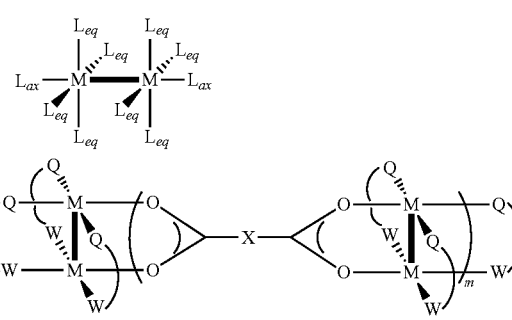

-continued

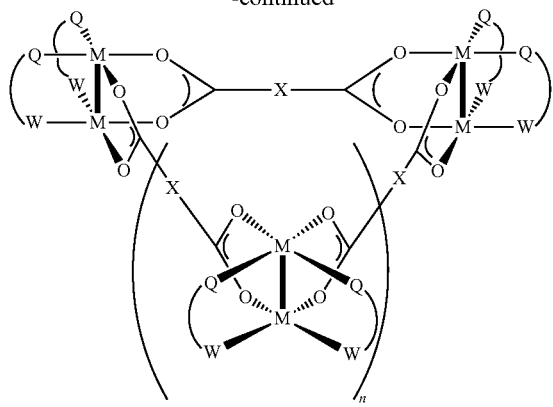

and a combination thereof; wherein:
$L_{ax}$ is an axial ligand;
$L_{eq}$ is an equatorial ligand; wherein two equatorial ligands together form a bidentate ligand

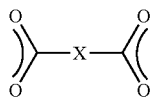

wherein each

is independently selected from the group consisting of:

M is a transition metal;

wherein

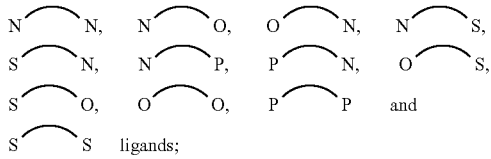

is a bridging group each independently selected from the group consisting of: $SO_4^{2-}$, $MoO_4^{2-}$, $WO_4^{2-}$, $ZnCl_4^{2-}$ and a dicarboxylate; and wherein m is an integer from 1 to 25, and n is 0 to 6;

(3) applying onto the metal-metal bonded complex monolayer a second linker compound represented by the formula:

G3-Linker$_b$-G4 to produce on the metal-metal bonded complex monolayer an organic monolayer; wherein G3 and G4 are the same or different functional groups capable of interacting with a metal-metal bonded complex; and Linker$_b$ is a single bond or a difunctional organic group bonded to G3 and G4; and optionally (4) sequentially repeating steps (2) and (3) at least once to produce the layer-by-layer grown thin film having alternating monolayers of a metal-metal bonded complex monolayer and an organic monolayer.

The length, functionality, direction of metal-metal vector, and other physical and chemical properties of each layer can be tuned by varying the metal-metal bonded units and the organic linkers. Preferably, the thin film has from 1 to 60 alternating monolayers of a metal-metal bonded complex monolayer and an organic monolayer. More preferably, the thin film has from 30 to 40 alternating monolayers of a metal-metal bonded complex monolayer and an organic monolayer.

The films are deposited from liquid solutions and therefore they may be deposited on substrates having diverse topography and configuration.

The following illustration describes the layer-by-layer growth methods used according to the present invention to fabricate metal-metal bonded compounds on a substrate.

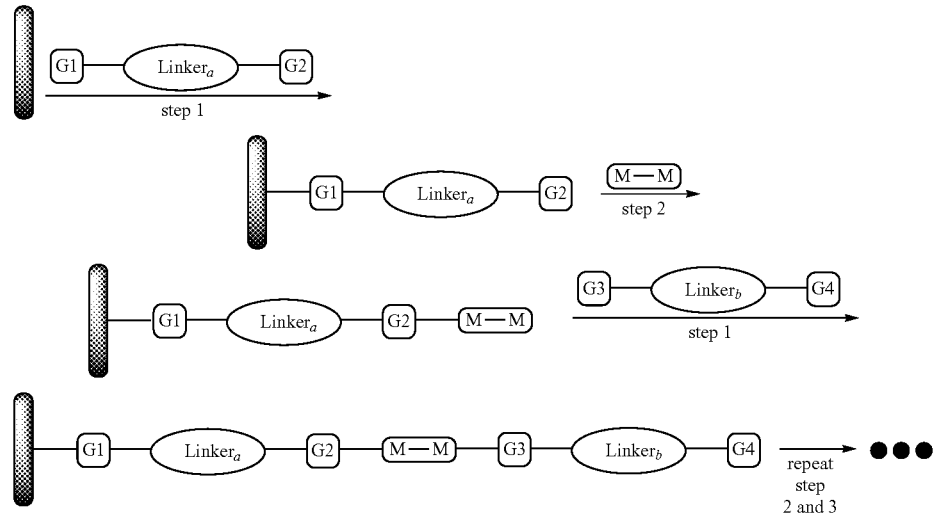

As a substrate, any suitable material can be used. Suitable substrates include, for example, a metal, a metal oxide, a semiconductor, a metal alloy, a semiconductor alloy, a polymer, an organic solid, and a combination thereof. The form of the substrates can be a planar solid or a non-planar solid such as a stepped or curved surface.

The following preferred substrates have been demonstrated: Au, ITO and $SiO_2$.

G1-Linker$_a$-G2 groups are suitable molecular species that can form a self-assembled monolayer including organic molecular species having a functional group G1 capable of interaction with the surface of the substrate forming a coated surface.

Examples of this group that can be designed into molecules for interacting with or binding to a particular substrate surface with chemical specificity include one or more of the same or different functional groups, such as phosphine oxide, phosphite, phosphate, phosphazine, azide, hydrazine, sulfonic acid, sulfide, disulfide, aldehyde, ketone, silane, germane, arsine, nitrile, isocyanide, isocyanate, thiocyanate, isothiocyanate, amide, alcohol, selenol, nitro, boronic acid, ether, thioether, carbamate, thiocarbamate, dithiocarbamate, dithiocarboxylate, xanthate, thioxanthate, alkylthiophosphate, dialkyldithiophosphate or a combination thereof.

Functional group G2 on the tran direction of G1 is capable of interaction with the next layer metal-metal boned molecules. Examples of this group that can be designed into molecules for interacting with or binding to a particular metal-metal bonded molecule with chemical specificity include one or more of the same or different functional groups. Thus, G2 in the first linker compound can independently be: 4-pyridyl, 3-pyridyl, cyano, 4-cyanophenyl, 3-cyanophenyl, perfluoro-3-cyanophenyl and perfluoro-4-cyanophenyl.

There are two types of these molecules, namely G2a and G2b in the disclosure for the direction definition. G2a is used for the axial direction linkage, such as nitrile, pyridyl, trimethylsilane compounds; and the G2b is used for the equatorial direction linkage, such as some bridging bidentate ligands with (N,N), (N,O), (O,O), (O,S), (P,P), (N,S), and (S,S) donor sets. Some typical examples of bidentate ligands are amidinates that are a (N,N) donor set, acetamides that are a (N,O) set, carboxylates that are a (O,O) set, thiocarboxylates that are a (O,S) set, diphosphines that are a (P,P) set, mercaptopyrimidines that are a (N,S) set, and dithiocarboxylates that are a (S,S) set.

The following molecules have been demonstrated:

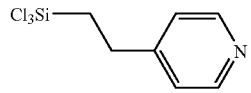

on oxides surfaces, and

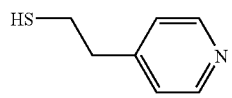

on Au surface.

III.

are suitable molecules containing at least one metal-metal bonded unit.

1. If the first monolayer ends with G2a group, examples of these metal-metal bonded compounds can be containing one or more than one metal-metal bonded units of which axial direction can interact with or bind to G2a group, such as the molecules containing one or more than one of the following metal-metal bonded cores: $Cr_2^{4+}$, $Mo_2^{4+}$, $Re_2^{6+}$, $Re_2^{5+}$, $Re_2^{4+}$, $Ru_2^{5+}$, $Ru_2^{6+}$, $Rh_2^{4+}$. Preferred molecules suitable for use as the molecular species that can interact with or bind to G2a group include: tetrakis(carboxylato)dichromium, tetrakis(carboxylato)dimolybdenum, tetrakis(amidinato)dichlorodirhenium, tetrakis(amidinato)chlorodiruthenium, tetrakis(carboxylato)dirhodium, tetrakis(amidinato)dirhodium, bis(carboxylato)bis(amidinato)dirhodium, and compounds containing more than one dimetal units.

If the first monolayer ends with G2b group, examples of these metal-metal bonded compounds can be containing one or more metal-metal bonded units of which equatorial direction can interact with or bind to G2b group, such as the molecules containing one of the following metal-metal bonded cores: $Cr_2^{4+}$, $Mo_2^{4+}$, $W_2^{4+}$, $Re_2^{6+}$, $Re_2^{5+}$, $Re_2^{4+}$, $Ru_2^{4+}$, $Ru_2^{5+}$, $Ru_2^{6+}$, $Os_2^{6+}$, $Rh_2^{4+}$. Preferred molecules suitable for use as the molecular species that can interact with or bind to G2b group include: tetrakis(carboxylato)dimetal (where the metal is the one of the above), decakis(acetonitrile)dimetal (where the metal is Mo, Re, and Rh).

The molecule that has been demonstrated is: $[Rh_2(cis-N, N'-di-p-anisylformamidinate)_2]_2(O_2CCH_2CO_2)_2$.

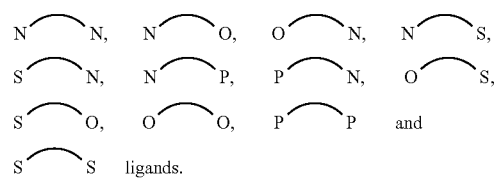

are suitable molecules bearing two functional groups at both ends. These functional groups will interact with or bind to the previous metal-metal bonded unit terminated surface. Both G3 and G4 functional groups are every similar to G2.

Thus, G3 and G4 in the second linker compound can independently be 4-pyridyl, 3-pyridyl, cyano, 4-cyanophenyl, 3-cyanophenyl, perfluoro-3-cyanophenyl and perfluoro-4-cyanopheny. Linker$_b$ can be a single bond, an alkylene, an alkenediyl, an alkynediyl, a 1,4-arylene, an arene-1,3,5-triyl, a 1,2,3-triazine-2,4,6-triyl, 4,4',4'',4'''-(21H,23H-porphine-5,10,15,20-tetrayl) and zinc complex of 4,4',4'',4'''-(21H,23H-porphine-5,10,15,20-tetrayl) and a combination thereof. Further examples of G3-Linker$_b$-G4 groups include polynitriles, polypyridyls, ditrimethylsilanes, and organic molecules containing at least two of any of the following donor sets used as bridging bidentate ligands: (N,N), (N,O), (O,O), (O,S), (P,P), (N,S), and (S,S), such as,

N⌒N, N⌒O, O⌒N, N⌒S,

S⌒N, N⌒P, P⌒N, O⌒S,

S⌒O, O⌒O, P⌒P and

S⌒S ligands.

Some molecules with tetrahedral geometry may also be used as equatorial linkers, such as $SO_4^{2-}$, $MoO_4^{*2-}$, $WO_4^{2-}$, $ZnCl_4^{2-}$.

Examples of the second linker compounds include compounds represented by the following formulas:

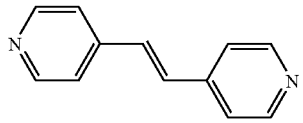

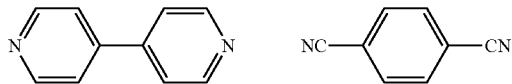

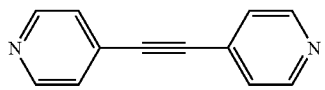

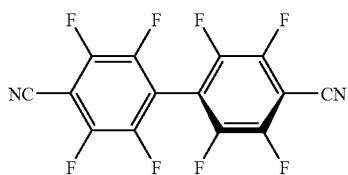

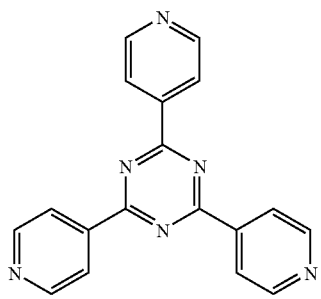

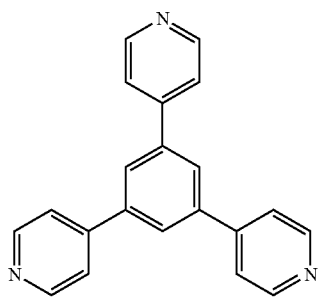

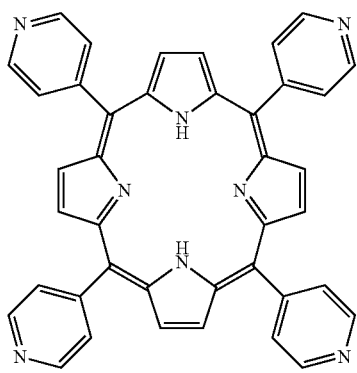

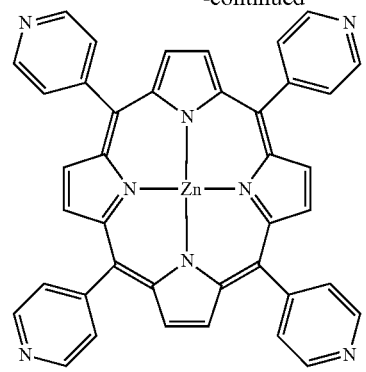

and acetylene or diacetylene linkers represented by the formulas:

which can be derived from derived from compounds represented by the formula:

$Me_3Si—C≡C—SiMe_3$ or

by desilylation of the trimethylsilyl group.

Preferred molecules carrying at least two required functional groups include:

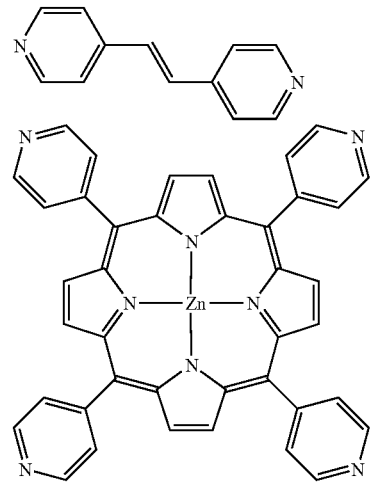

In a preferred embodiment, the process of the present invention includes the steps of:

(1) applying onto a surface of a substrate a first linker compound represented by the formula:

$G1-Linker_a-G2$ to produce a primer layer of the first linker compound; wherein G1 is selected from the group consisting of: $Cl_3Si$ and SH; G2 is selected from the group consisting of: 4-pyridyl and 4-cyanophenyl; and $Linker_a$ is selected from the group consisting of: $C_1$-$C_8$ alkylene, $C_1$-$C_8$ alkenediyl, $C_1$-$C_8$ alkynediyl and 1,4-arylene;

(2) applying onto the primer layer a metal-metal bonded complex to produce on the primer layer a metal-metal bonded complex monolayer; wherein the metal-metal bonded complex is selected from the group consisting of compounds represented by the following formulas:

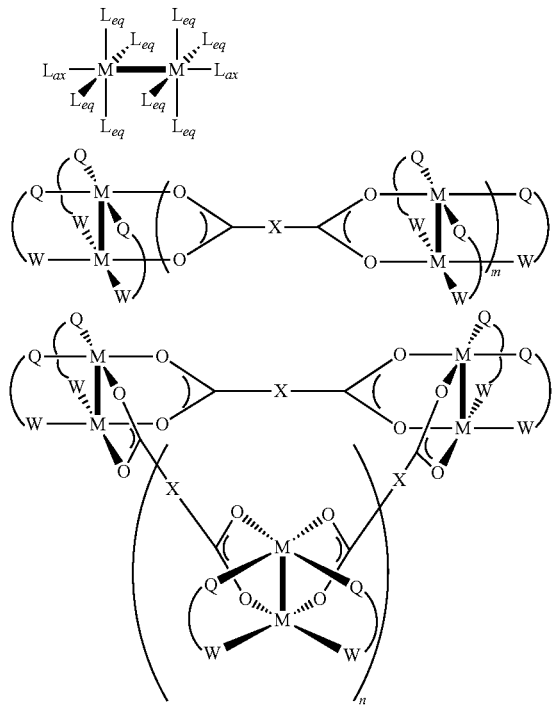

and a combination thereof; wherein:
$L_{ax}$ is an axial ligand;
$L_{eq}$ is an equatorial ligand; wherein two equatorial ligands together form a bidentate ligand

wherein each

is independently selected from the group consisting of:

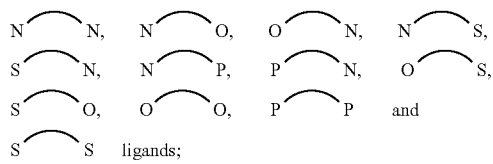

M is a transition metal;
wherein the group

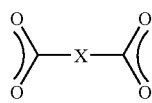

is a dicarboxylate bridging group selected from the group consisting of compounds represented by the formulas:

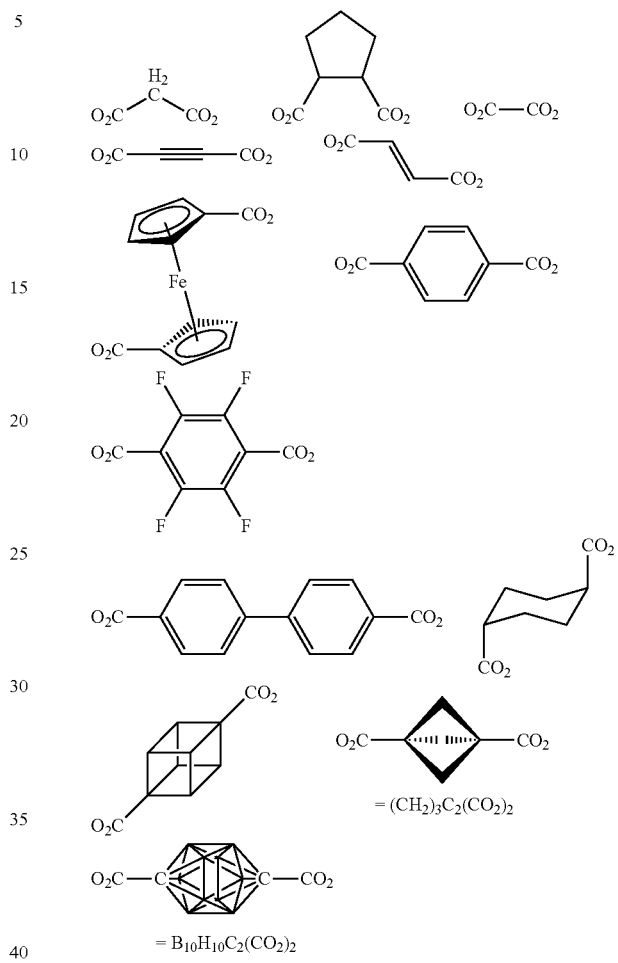

and mixtures thereof; and
wherein m is an integer from 1 to 12, and n is 0 to 3;
(3) applying onto the metal-metal bonded complex monolayer a second linker compound represented by the formula:

to produce on the metal-metal bonded complex monolayer an organic monolayer; wherein G3 and G4 are the same or different functional groups capable of interacting with a metal-metal bonded complex; and $Linker_b$ is a single bond or a difunctional organic group bonded to G3 and G4; and optionally
(4) sequentially repeating steps (2) and (3) at least once to produce the layer-by-layer grown thin film having alternating monolayers of a metal-metal bonded complex monolayer and an organic monolayer.

In the first step, the substrates used for film growth can be various kinds of metals, insulators, and semiconductors such as glass, quartz, aluminum, gold, platinum, gold/palladium alloy, silicon, thermally grown silicon dioxide on silicon, and indium-tin-oxide coated glass. Since the films are deposited from liquid solutions, they may be deposited on substrates having diverse topography and configuration. The form of the substrates can be a planar solid or a non-planar solid such as a stepped or curved surface.

The second step of thin film deposition is to treat the modified substrate with an appropriate compound containing at least one metal-metal bonded unit from solution. Metal-metal bond units will interact with N atoms through their axial directions or with bidentate ligands through their equatorial directions. The opposite direction that has not been used to interact with the molecular template will be used as the site for the next step of the layer-by-layer thin film growth. The metal atoms used in the metal-metal bonded units may be any of the following: V, Nb, Cr, Mo, W, Tc, Re, Fe, Ru, Os, Co, Rh, Ir, Ni, Pd, Pt, Cu, Ag.

In the third step, the metal-metal bond unit terminated surface is treated with a solution containing molecules bearing at least two functional groups.

For axial linking these functional groups may be any kind of nitrile or pyridyl containing N-donor atoms. Thus, the organic molecules will be polypyridyls, polynitriles, or will contain both pyridyl and nitrile functionalities.

For equatorial linkers, they can be organic molecules containing at least two of any of the following donor sets used as bridging bidentate ligands: (N,N), (N,O), (O,O), (N,P), (P,P), (N,S), and (S,S). Some molecules with tetrahedral geometry may also be used as equatorial linkers, such as $SO_4^{2-}$, $MoO_4^{2-}$, $WO_4^{2-}$, $ZnCl_4^{2-}$.

The next step is to repeat the above two steps to add additional layers, but the metal-metal bonded units and organic linkers are not required to be the same, as long as they have a similar structural moiety. This provides a versatile means of assembling multilayer heterostructures from various metal-metal bonded building blocks, with essentially any desired sequence of layers.

The scheme below illustrates an example of multilayer thin film growth including of alternating layers of the redox active metal-metal bonded supramolecules $[Rh_2(DAniF)_2]_2(O_2CCH_2CO_2)_2$ (DAniF=N,N'-di-p-anisylformamidinate), 1, and trans-1,2-bis(4-pyridyl)ethylene, 2, on pyridyl functionalized oxide substrates, such as quartz, indium-tin-oxide (ITO), and silicon wafers that have a native or thermally grown silicon dioxide surface.

The oxide substrates were cleaned as follows: each substrate was first treated in UV/ozone for 30 min., then rinsed thoroughly with acetone, dichloromethane, and water, and then dried in an oven at 120° C. for at least 2 h. The substrate was treated again in UV/ozone for another 30 min. right before film deposition.

Substrates were first silated by immersion in a toluene solution containing 1 mM 4-[2-(trichlorosilyl)]-ethylpyridine for 30 min. After rinsing with copious amounts of toluene and ethanol, the substrates were vacuum-dried. Metal-metal bonded molecular films were grown by first dipping the substrates into a 0.1 mM toluene solution of molecule 1 for 2 h at −15° C. and then in a 0.1 mM ether solution of 2 for 30 min at room temperature, with rinsing between steps.

After the first bilayer was deposited, the procedure was repeated, but with the soaking time reduced to 1 min for each solution, until the desired number of bilayers had been obtained.

These steps can be schematically represented as follows:

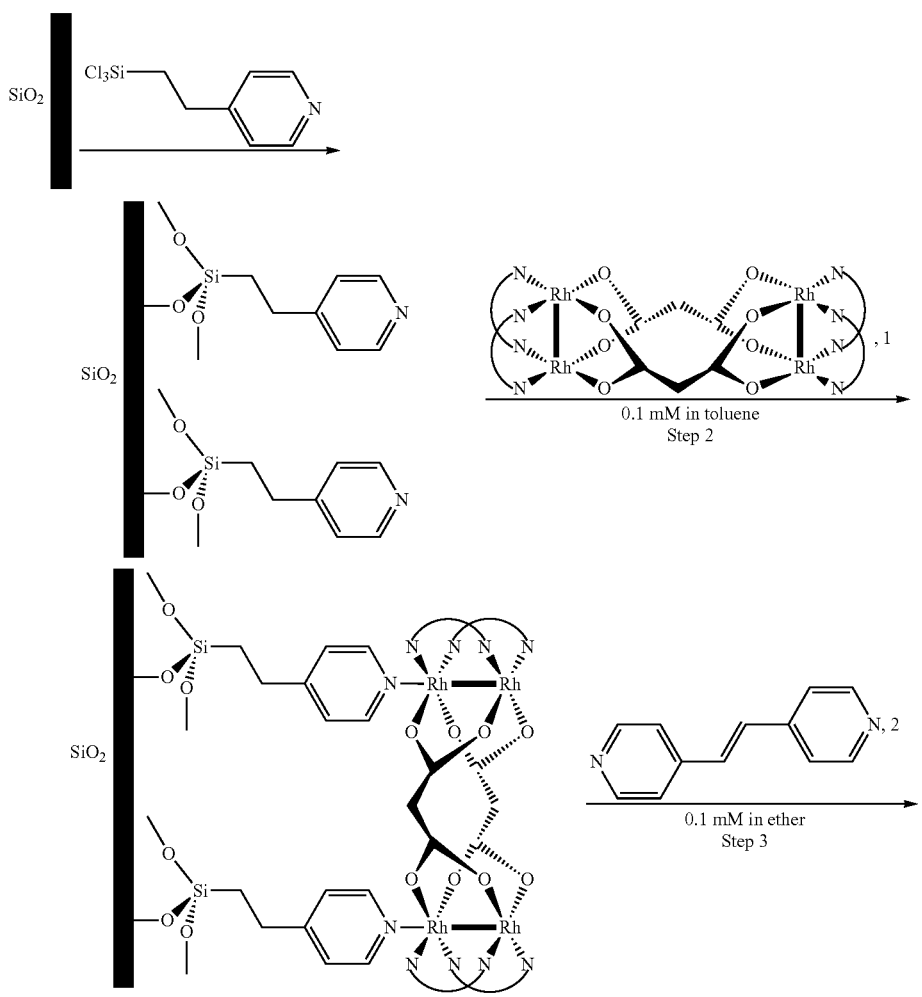

-continued

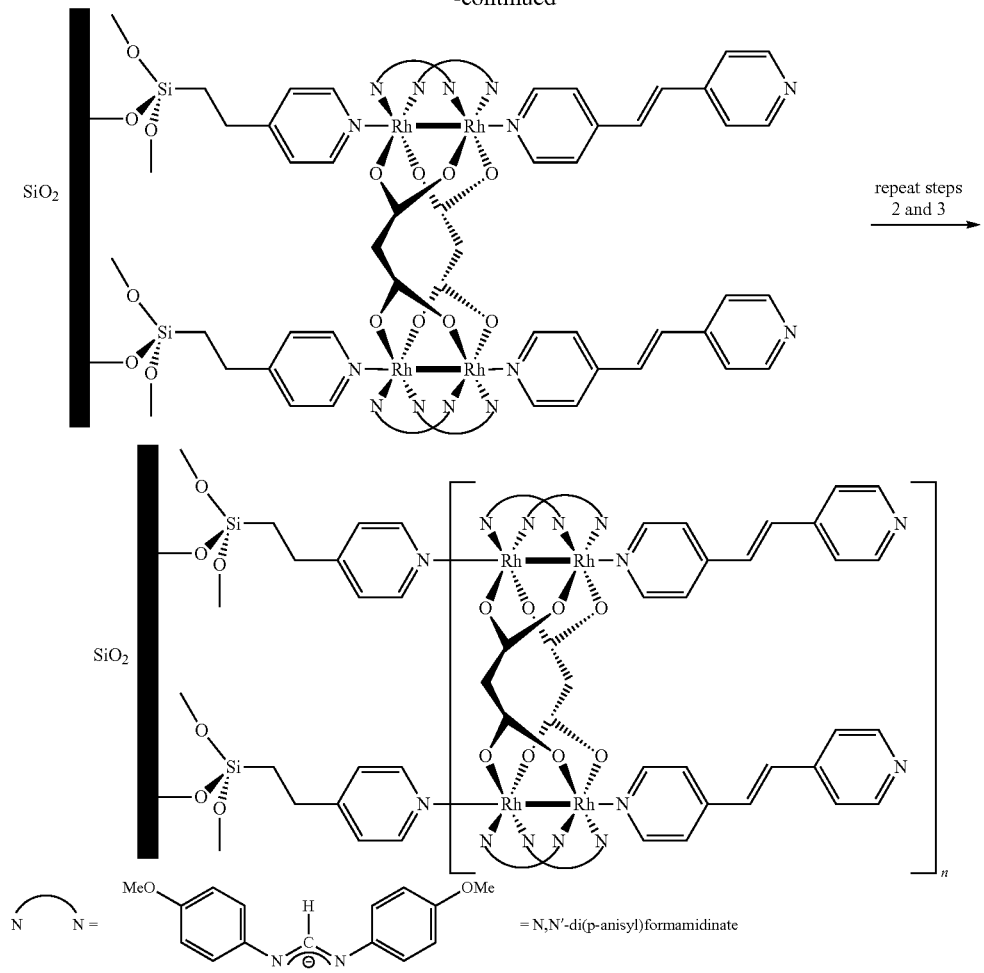

FIG. 1 illustrates the monitoring of film growth by UV-VIS spectroscopy. There are two noticeable bands at 258 and 296 nm for these bilayer films. The linear increase in absorbance as a function of the number of bilayers indicates that the same amount of material is being deposited in each dipping cycle. A linear least-squares regression of the absorbance data at 258 nm for 10 bilayers, as can be seen in the inset of FIG. 1, gives a slope of 0.010 absorbance unit per bilayer with the regression coefficient of 0.998. In order to calculate the surface coverage of the film, we assume that the solution $\epsilon_{max}$ values are the same as the extinction coefficient for the two-dimensional layer. Based on this assumption the calculated average bilayer coverage of the film is about $1.1 \times 10^{-10}$ mol/cm$^2$. This value is consistent with that of $1.0 \times 10^{-10}$ mol/cm$^2$ calculated for dense packing of molecules using the lattice constants from the single crystal X-ray structure solution. Thus, the film formation here is close to the tight packing of molecules as measured in the bulk solid. The formation of the bilayer films was also monitored directly by atomic force microscopy. Predesigned sharp edge steps were made in silicon dioxide by etching steps into the oxide in a pattern defined by a photoresist mask.

Figure 2:
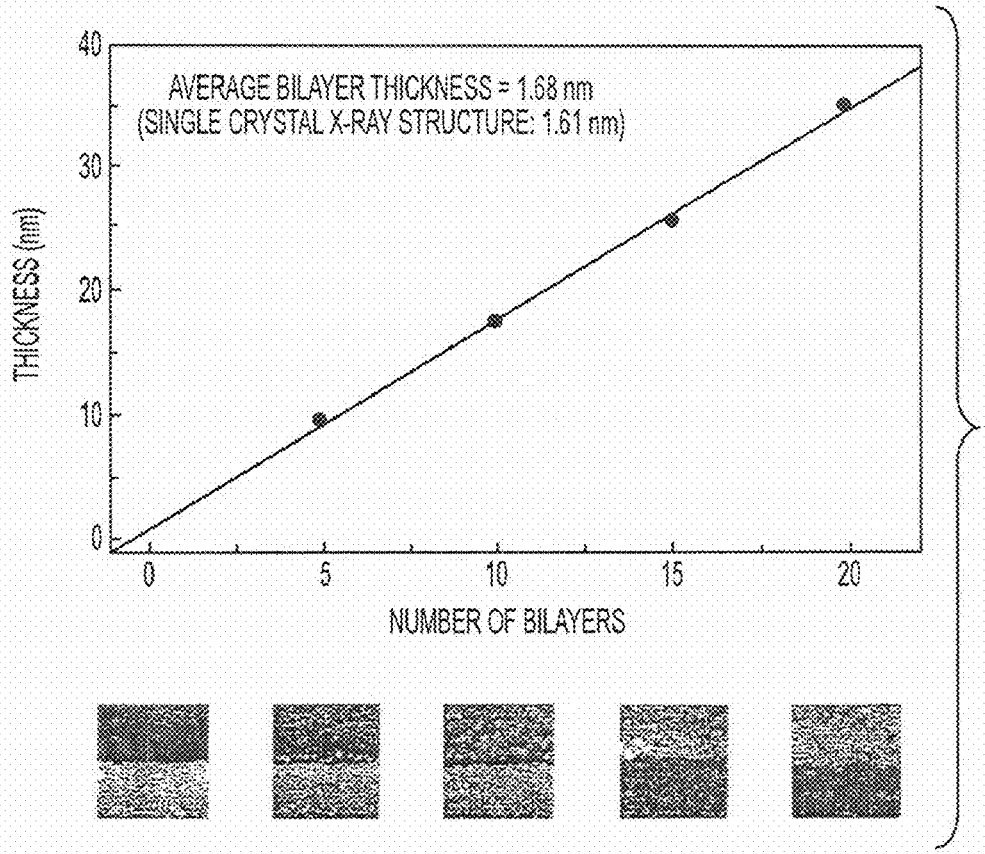
FIG. 2. AFM measurements of thin film thickness and corresponding images of thin films including of 5, 10, 15, and 20 bilayers.

FIG. 2 shows the increase in the film thickness as a function of the number of bilayers, together with its corresponding AFM pictures near the step edge. The linear regression fit gives a slope of 1.68 nm, corresponding to the average bilayer thickness, and an interception of 0:6 nm, corresponding to thickness of silane monolayer. In the single crystal X-ray structure, the length of each bilayer is about 1.61 nm. Thus, our results suggest that the metal-metal bonded layers grow nearly perpendicular to the substrate surface.

Figure 3:
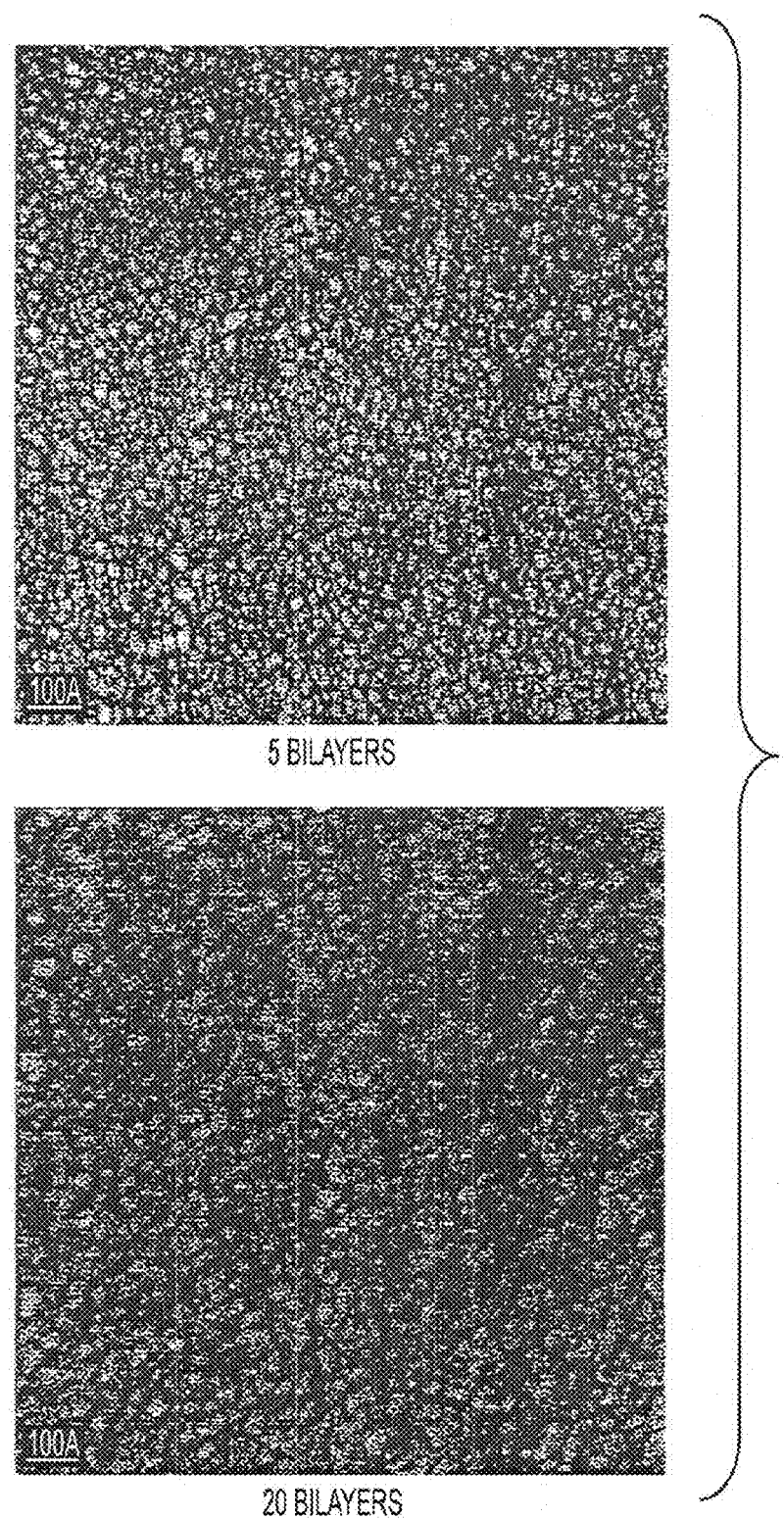
FIG. 3. AFM images of thin films grown on thermally oxidized Si wafers including of 5 and 20 bilayers.

FIG. 3 shows the images of 5- and 20-bilayer films on oxidized Si wafers. The uniformity and morphology of the prepared thin films have been evaluated by atomic force microscopy. The films in both cases produce a roughnesses of about 0.6 nm. These numbers are much less than a monolayer thickness. With both UV-vis spectra and AFM characterization, we conclude that the structure of the bilayer films on the oxide surfaces is similar to the tightly packed bulk solid-state single crystal structure.

Figure 4:
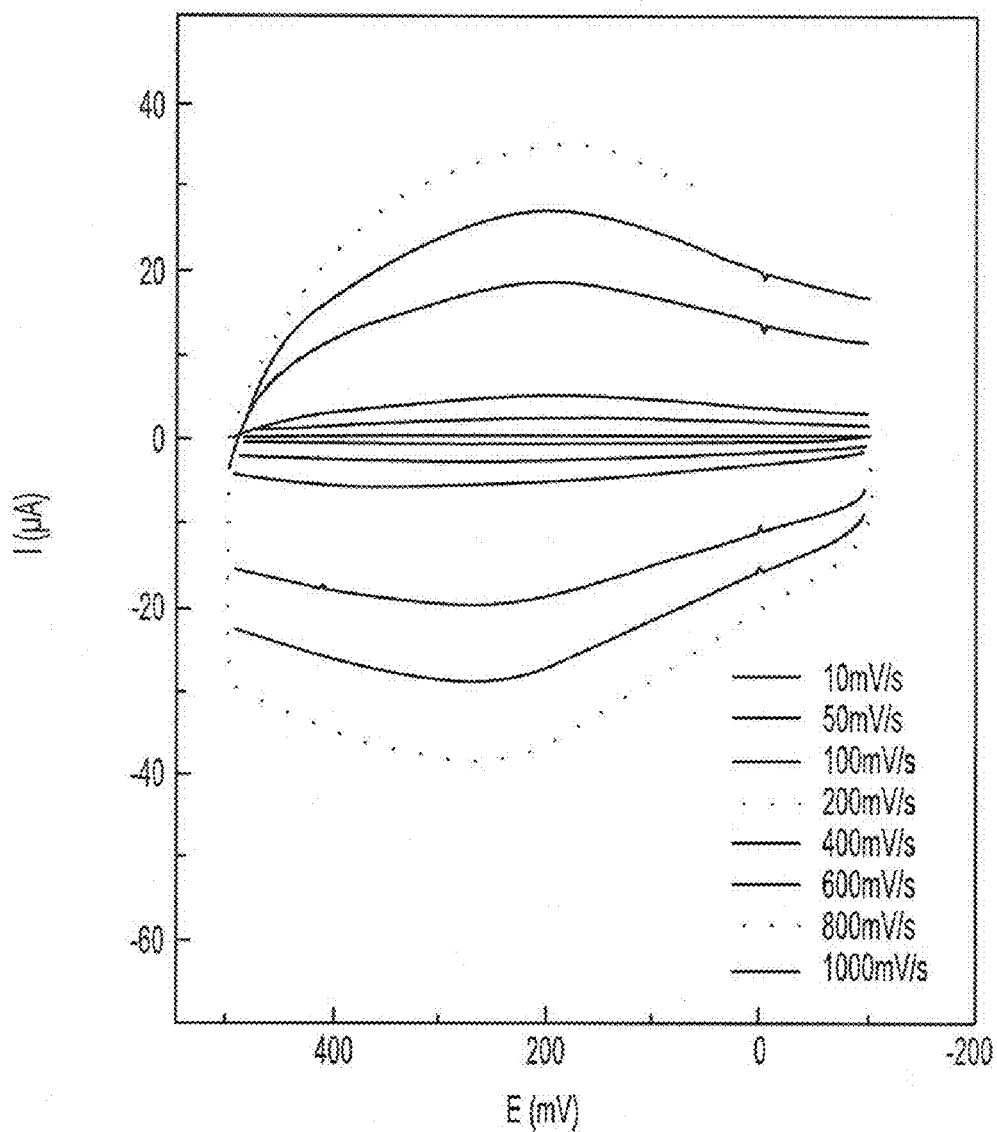
FIG. 4. Cyclic voltammograms of one bilayer of the metal-metal bonded compound $[Rh_2(DAniF)_2]_2(O_2CCH_2CO_2)_2$ $(NC_5H_4CHCHC_5H_4N)_4$ on a modified ITO electrode.

FIG. 4 shows the results of careful examination of thin films grown on ITO surfaces by cyclic voltammetry in 1M NaCl aqueous solution. The oxidation potential of $Rh_2^{4+}$ to $Rh_2^{5+}$ in bilayer films occurs at 220 mV, according to $E_{1/2} = (E_{pa} + E_{pc})/2$. This value is close to that found for compound 1 in the $CH_2Cl_2$ solution with a Pt working electrode (310 mV). The average separation of $E_{pa}$ and $E_{pc}$ is 88 mV while varying the scan rate from 10 to 1000 mV/s. The peak currents show a linear dependence upon the scan rate. All these results indicate that the metal-metal bonded bilayer films are surface-bound, reversibly redox active species as in the bulk analog.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

The invention claimed is:

1. A film having alternating monolayers of a metal-metal bonded complex monolayer and an organic monolayer by layer-by-layer growth, prepared by a process comprising:

(1) applying onto a surface of a substrate a first linker compound represented by the formula:

G1-Linker$_a$-G2 to produce a primer layer of said first linker compound; wherein G1 is selected from the group consisting of: Cl$_3$Si and SH; G2 is selected from the group consisting of: 4-pyridyl 3-pyridyl, cyano, 4-cyanophenyl, 3-cyanophenyl, perfluoro-3-cyanophenyl and perfluoro-4-cyanophenyl: and Linker$_a$ is selected from the group consisting of: C$_1$-C$_8$ alkylene, C$_1$-C$_8$ alkenediyl, C$_1$-C$_8$ alkynediyl and 1,4-arylene;

(2) applying onto said primer layer a metal-metal bonded complex to produce on said primer layer a metal-metal bonded complex monolayer; wherein said metal-metal bonded complex is selected from the group consisting of compounds represented by the following formulas:

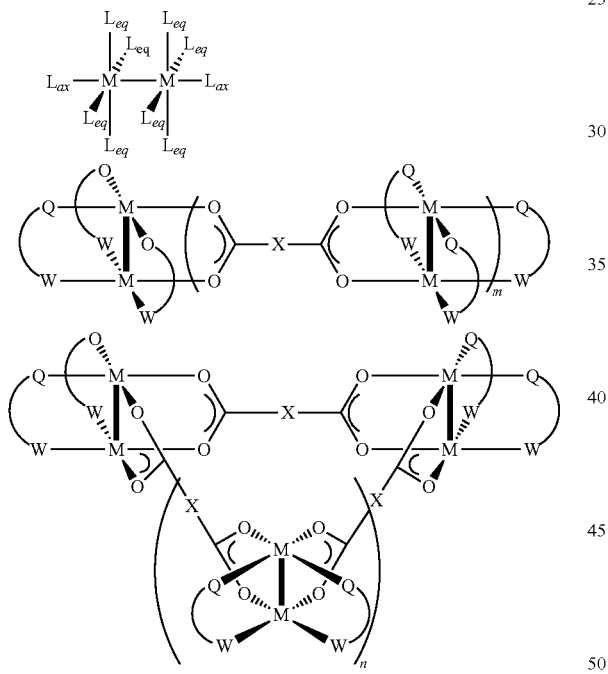

and a combination thereof; wherein:

L$_{ax}$ is an axial ligand;

L$_{eq}$ is an equatorial ligand; wherein two equatorial ligands together form a bidentate ligand

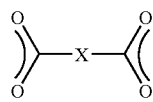

wherein each

Q⌒W is independently selected from the group consisting of

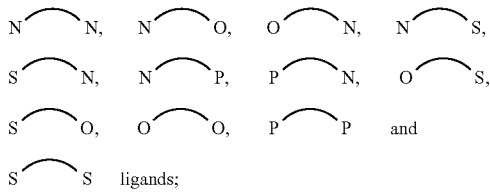

M is a transition metal;

wherein the group $$\overset{O}{\underset{O}{\bigg)}}-X-\overset{O}{\underset{O}{\bigg(}}$$

is a dicarboxylate bridging group selected from the group consisting of compounds represented by the formulas:

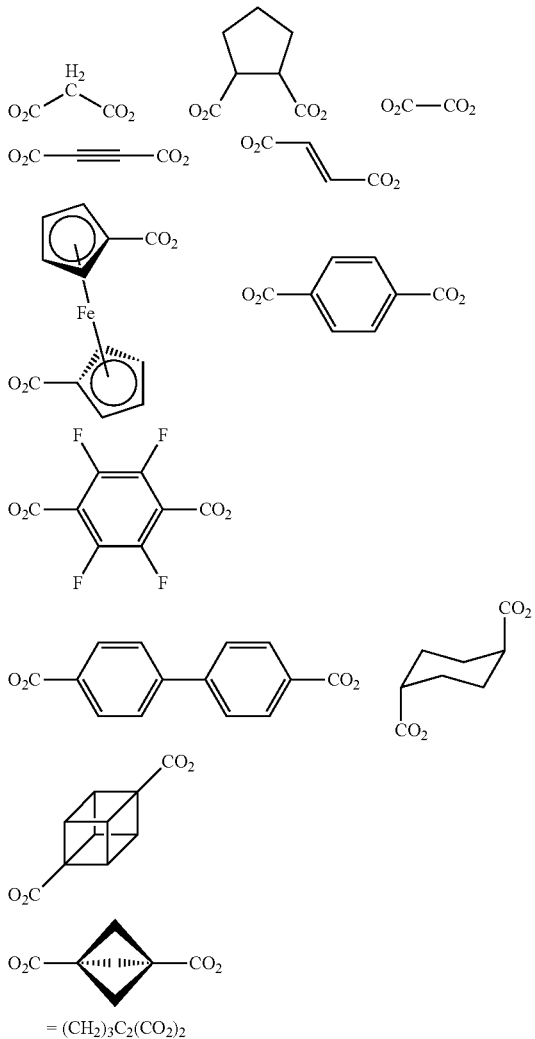

= (CH$_2$)$_3$C$_2$(CO$_2$)$_2$

-continued

$= B_{10}H_{10}C_2(CO_2)_2$ and mixtures thereof; and wherein m is an integer from 1 to 12, and n is 0 to 3;

(3) applying onto said metal-metal bonded complex monolayer a second linker compound selected from the group consisting of:

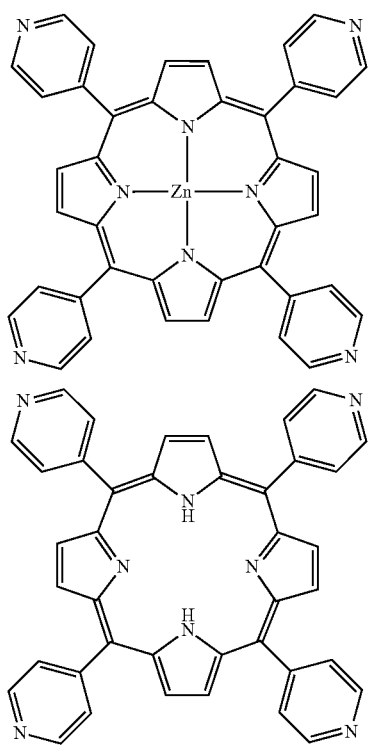

and and optionally (4) sequentially repeating steps (2) and (3) at least once to produce said layer-by-layer grown thin film having alternating monolayers of a metal-metal bonded complex monolayer and an organic monolayer.

2. The film of claim 1, wherein said transition metal in said metal-metal bonded complex is selected from the group consisting of: $Cr_2^{4+}$, $Mo_2^{4+}$, $Re_2^{6+}$, $Re_2^{5+}$, $Re_2^{4+}$, $Ru_2^{5+}$, $Ru_2^{6+}$, $Rh_2^{4+}$ and a combination thereof.

3. The film of claim 1, wherein said first linker compound is selected from the group consisting of a compound represented by the formula:

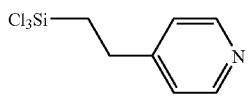

for oxides surfaces and a compound represented by the formula:

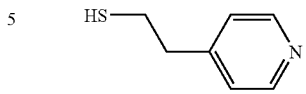

for Au surfaces.

4. The film of claim 1, wherein said $L_{ax}$ axial ligand is selected from the group consisting of: acetonitrile, halide, DMSO, $H_2O$, ethanol, methanol and a combination thereof.

5. The film of claim 1, wherein said

bidentate ligand is an amidinate; said

bidentate ligand is acetamide; said

bidentate ligand is mercaptopyrimidine; said

bidentate ligand is a thiocarboxylate; said

bidentate ligand is a carboxylate; said

bidentate ligand is a diphosphine; and said

bidentate ligand is a dithiocarboxylate.

6. The film of claim 1, wherein said metal-metal bonded complex is represented by the formula:

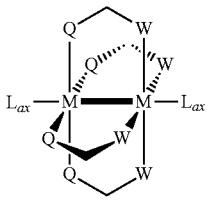

wherein said bidentate ligand

is selected from the group consisting of:

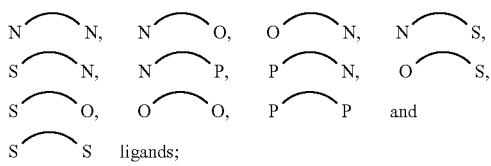

ligands;

$L_{ax}$ is acetonitrile, halide, DMSO, $H_2O$, ethanol, or methanol: and M is selected from the group consisting of: Cr, Mo, Re, Ru, and Rh.

7. The film of claim 1, wherein G1 is $Cl_3Si$.

8. The film of claim 1, wherein said second linker compound is derived from a compound represented by the formulas:

$Me_3Si—C≡C—SiMe_3$

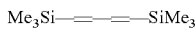

by desilylation of the trimethylsilyl group to produce an acetylene or diacetylene linker represented by the formula:

—C≡C— or —C≡C—C≡C—.

9. The film of claim 1, wherein said metal-metal bonded complex is selected from the group consisting of compounds represented by the following formulas:

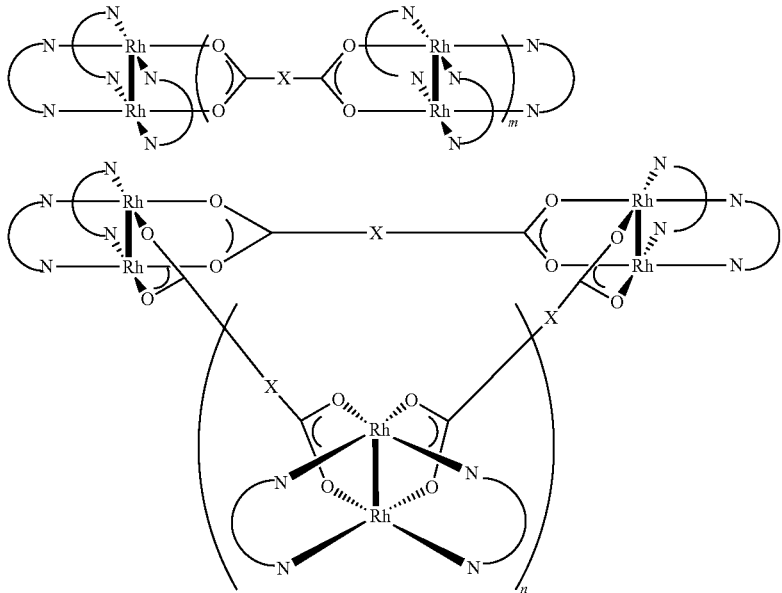

and a combination thereof;

wherein

is a bidentate ligand;

wherein the group

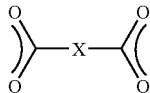

is a dicarboxylate bridging group selected from the group consisting of compounds represented by the formulas:

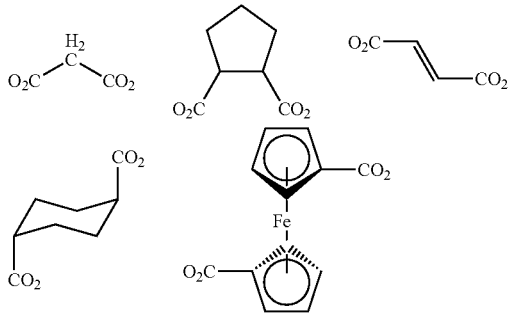

and mixtures thereof; and wherein m is an integer from 1 to 12, and n is 0 to 3.

10. The film of claim 1, wherein said metal-metal bonded complex is represented by the formula:

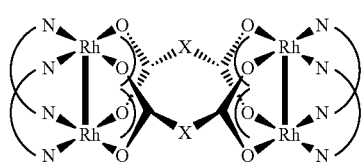

wherein

is N,N'-di-p-anisylformamidinate ligand; and wherein the group

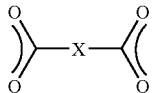

is a dicarboxylate bridging group selected from the group consisting of compounds represented by the formulas:

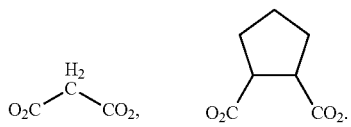

11. The film of claim 1, wherein said substrate is selected from the group consisting of: a metal, a metal oxide, a semiconductor material, a metal alloy, a semiconductor alloy, a polymer, an organic solid and a combination thereof.

12. The film of claim 11, wherein said substrate is selected from the group consisting of: Au, ITO and $SiO_2$.

13. The film of claim 1, which has from 1 to 60 alternating monolayers of a metal-metal bonded complex monolayer and an organic monolayer.

* * * * *